(12) United States Patent
Wu

(10) Patent No.: US 7,618,481 B2
(45) Date of Patent: Nov. 17, 2009

(54) CORE UNIT OF A DEHUMIDIFIER

(75) Inventor: Jimmy Wu, Taipei (TW)

(73) Assignee: Bossmen Inc., Taipei (TW)

( * ) Notice: Subject to any disclaimer, the term of this patent is extended or adjusted under 35 U.S.C. 154(b) by 357 days.

(21) Appl. No.: 11/756,085

(22) Filed: May 31, 2007

(65) Prior Publication Data
US 2007/0283811 A1    Dec. 13, 2007

(30) Foreign Application Priority Data
Jun. 9, 2006    (TW) ............................. 95120600 A

(51) Int. Cl.
*B01D 53/04*    (2006.01)
*B01D 53/26*    (2006.01)
(52) U.S. Cl. ............................. 96/121; 34/80
(58) Field of Classification Search ............... 96/108, 96/121, 122, 134; 34/79, 80, 472; 55/DIG. 17
See application file for complete search history.

(56) References Cited

U.S. PATENT DOCUMENTS

| | | | |
|---|---|---|---|
| 4,468,239 A * | 8/1984 | Frantz ........................ | 96/114 |
| 4,891,051 A * | 1/1990 | Frantz ........................ | 96/114 |
| 4,919,695 A * | 4/1990 | Trepaud ...................... | 96/126 |
| 5,286,282 A * | 2/1994 | Goodell et al. ............... | 96/113 |
| 5,344,474 A * | 9/1994 | Null ........................... | 55/344 |
| 5,785,742 A * | 7/1998 | Mitsch ....................... | 96/144 |
| 5,961,698 A * | 10/1999 | Dossaji et al. ............... | 96/130 |
| 6,203,601 B1 * | 3/2001 | Trapp et al. ................. | 96/130 |
| 6,581,297 B1 * | 6/2003 | Ginder ........................ | 34/79 |
| 2005/0188848 A1 * | 9/2005 | Salzman et al. .............. | 96/134 |
| 2008/0216661 A1 * | 9/2008 | Mahoney et al. ............. | 96/147 |

* cited by examiner

*Primary Examiner*—Frank M Lawrence
(74) *Attorney, Agent, or Firm*—Apex Juris, pllc; Tracy M Heims

(57) ABSTRACT

A core unit of a dehumidifier comprises two towers and an upper and a lower air valve. The two towers are mounted in parallel between the upper and lower air valves and respectively filled with a drying agent. Two control valves are respectively connected to the corresponding tower through the lower air valve. When pressurized air flows into the lower air valve, the lower air valve determines that the air go to one of the two towers linked to the other tower by an equalizing slot, causing a difference in air pressure between the two towers. When the air pressure of the two towers is equal, the lower air valve changes the tower to receive the pressurized air and allows the drying agent in the other tower to dry out. Therefore, the two towers generate dry air alternately whilst reducing manufacturing costs.

11 Claims, 6 Drawing Sheets

CORE UNIT OF A DEHUMIDIFIER

BACKGROUND OF THE INVENTION

1. Field of the Invention

The present invention relates to a dehumidifier, especially to a core unit of a dehumidifier.

2. Description of Related Art

Some storage rooms require a dry environment to protect products in the storage room from moisture, especially electronics, semiconductors, paper and such like.

A dehumidifier dries air and uses one of two methods, mechanical extraction or using a desiccant. The dehumidifier using a desiccant has a core unit, drying agent, two solenoids, a solenoid driver and a water release gate.

The core unit has an air inlet, an air outlet and a water outlet and is filled with the drying agent. The drying agent removes water from the air and has two specified limits, a saturation limit and a dry limit. The saturation limit is when the drying agent has absorbed too much water, the dry limit is when the drying agent can absorb more water. The two solenoids are respectively attached to the air outlet and the air inlet and further electronically connected to the solenoid driver. The solenoid driver drives the solenoids to determine whether the air inlet or air outlet is open or closed. The water release gate is connected to the water outlet of the air inlet.

When air flows through the core unit water contained in the air is absorbed by the drying agent, so producing dry air, that is in turn released through the air outlet of the core unit. When water absorbed in the drying agent reaches the saturation limit, the solenoid driver is activated to close the air inlet and outlet and the water release gate opens, so the water outlet releases the water until the drying agent is at the dry limit. Since dry air is not generated whilst releasing water from the water outlet, the dehumidifier does not continually dry air and a rate of drying is slow. Therefore, the dehumidifier must be large to dry enough air.

Nitrogen can also be used to dehumidify an environment but is very expensive.

SUMMARY OF THE INVENTION

The main objective of the present invention is to provide a core unit for a dehumidifier that has fewer elements so reduces manufacturing costs and provides a continuous flow of dry air.

The core unit of a dehumidifier has two towers, an upper air valves with two single-way valves, a lower air valve with an internal check valve and two control valves. The two towers are mounted in parallel between the upper and lower air valves and respectively filled with a drying agent. The two control valves are respectively connected to the corresponding tower through the lower air valve. The two check valves are respectively mounted inside the corresponding tower to release drying air in the corresponding tower. When pressurized air flows into the lower air valve, a three way valve inside the lower air valve determines to which tower it flows and is linked to the other tower by an equalizing slot, causing a difference in air pressure between the two towers. The air passes through the drying agent to become dry air. The dry air is released by the check valve corresponding to the tower generating the dry air. When the air pressures of the two towers is equal the control valve corresponding to the tower is opened, causing the three way valve to change the tower to receive the pressurized air and allows the drying agent in the other tower to dry out. The flows to the other tower to repeat the operations mentioned above. Therefore, the drying core unit uses two towers to generate the dry air alternately, so the dry air is generated continually. In addition, the dehumidifier using the core unit has a simple structure that reduces manufacturing costs.

Other objectives, advantages and novel features of the invention will become more apparent from the following detailed description when taken in conjunction with the accompanying drawings.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE PREFERRED EMBODIMENT

Figure 1:
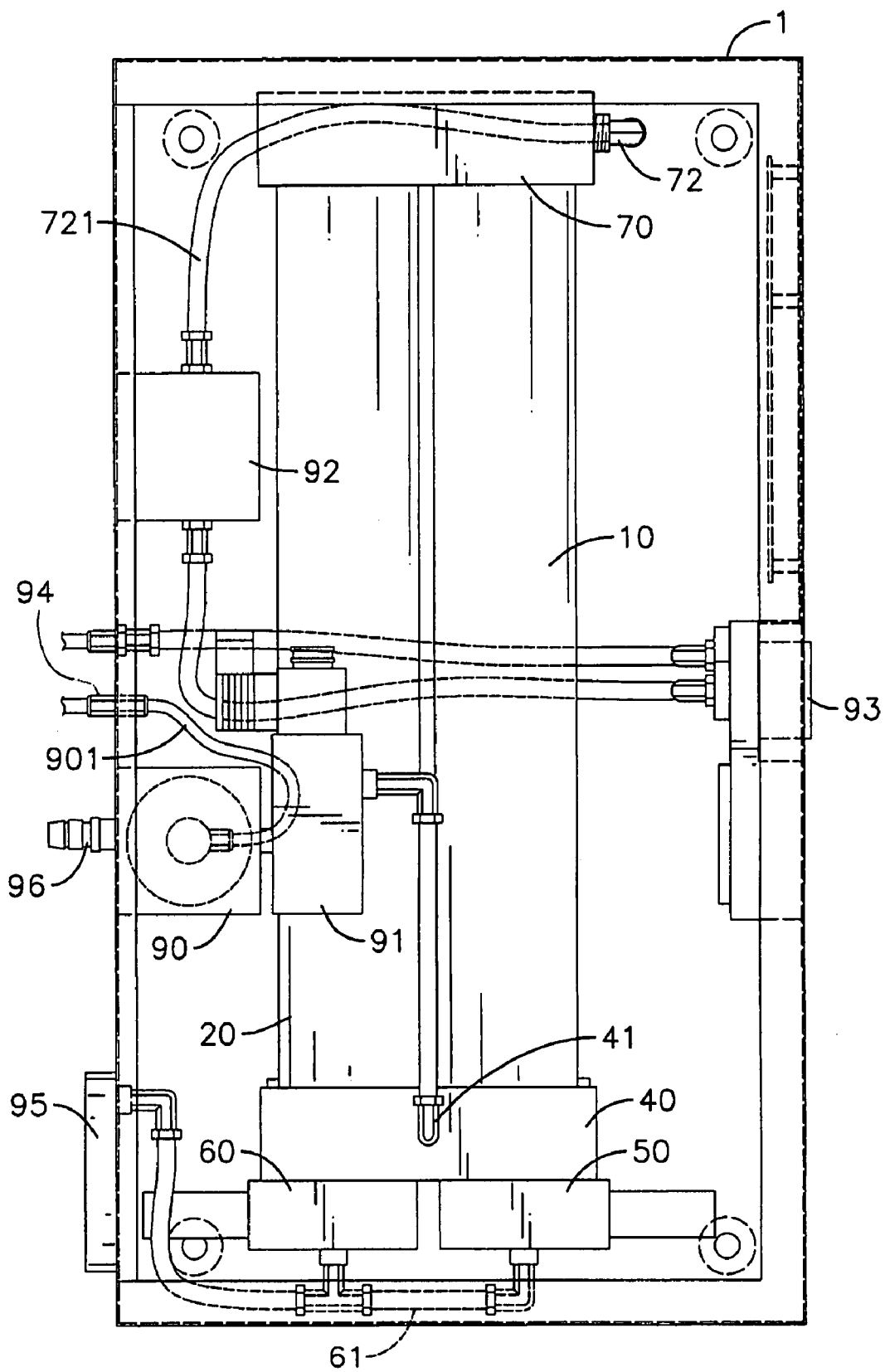
FIG. 1 is a top view in partial section of a dehumidifier in accordance with the present invention.
Figure 2:
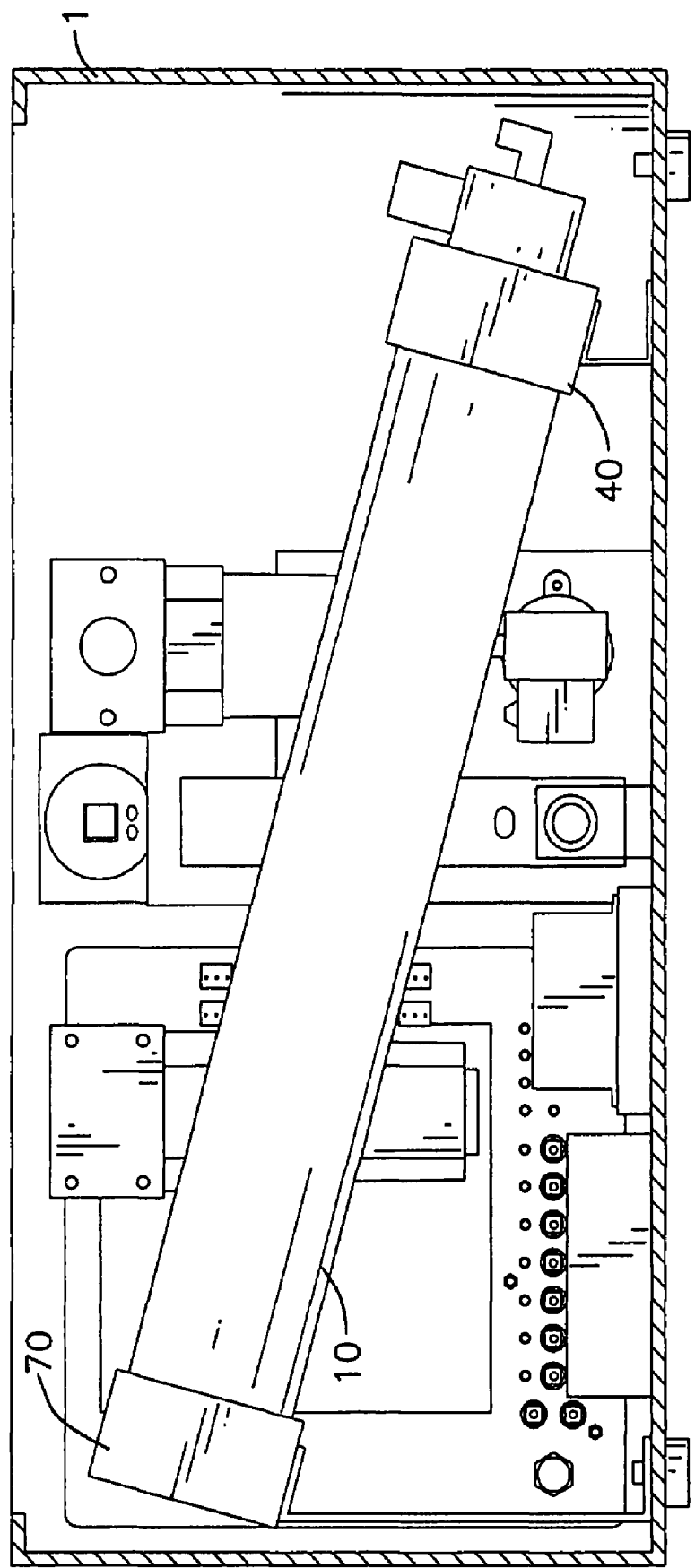
FIG. 2 is a cross sectional view in partial of the dehumidifier in accordance with the present invention.

With reference to FIGS. 1 and 2, a dehumidifier has a casing (1), an core unit, a pre-drier (90), an compressor (91), an optional filter (92), an air intake (96), an air vent (93), a water outlet (94), a core unit water outlet (95), a flow meter and a pressure gauge.

The core unit, the pre-drier (90), the compressor (91) and the filter (92) are mounted inside the casing (1), The air intake (96), the air vent (93), the water outlet (94), the water outlet (95) are mounted through the casing (1), and the flow meter and the pressure gauge are mounted on the casing (1). The flow meter and the pressure gauge detect the air flow and pressure values of air output from the compressor (91) and then display the air flow and pressure values.

The air intake (96) is mounted through the casing and provides moist air to the pre-drier (90). The pre-drier (90) is mounted in the casing and is connected to the water outlet (94), mounted through the casing (1). Since moist air contains water, the pre-drier (90) removes some water from the moist air and releases this water through the water outlet (94).

The compressor (91) is mounted in the casing (1) and connected to the pre-drier (90) and the core unit. The compressor (91) is supplied pre-dried air from the pre-drier (90) and raises the pressure to supply pressurized air to the core unit.

The core unit is mounted in the casing (1) at an angle to the vertical, and connected to the filter (92), the water outlet (95) and the compressor (91). The water outlet (95) is mounted through the casing (1). The core unit further removes moisture from pre-dried air from the pre-drier (90) to provide dried air to the filter (92) or directly to the air vent (93), and releases the water from the pre-dried air through the water outlet (95). The filter (92) is mounted in the casing (1) and filters the dried air from the core unit to supply dry filtered air to the air vent (93). The air vent (93) is mounted through the casing (1) and channels the dry air, or dry filtered air into a room. Therefore, the dehumidifier provides dry or dry filtered air to the room, container or such like.

Figure 3:
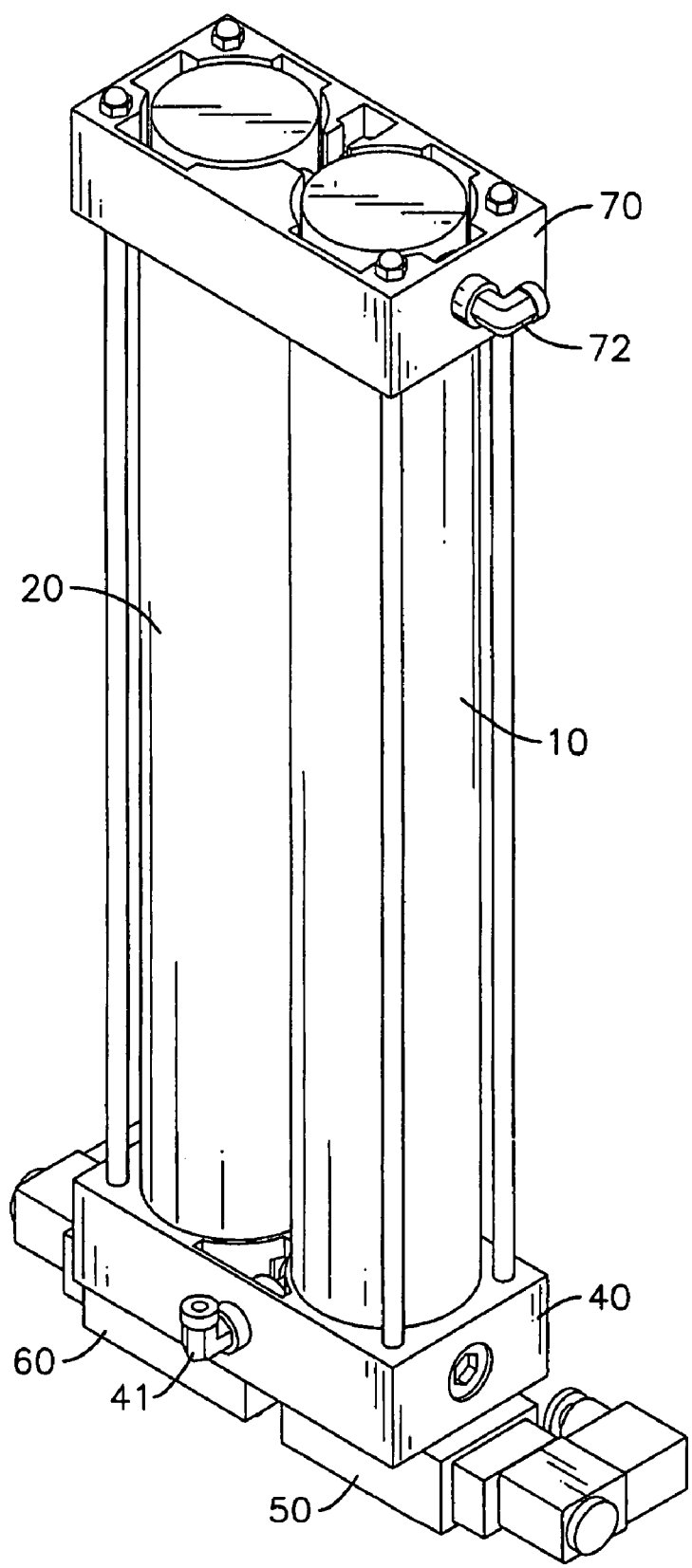
FIG. 3 is a perspective view of a core unit for the dehumidifier in FIGS. 1 and 2.
Figure 4:
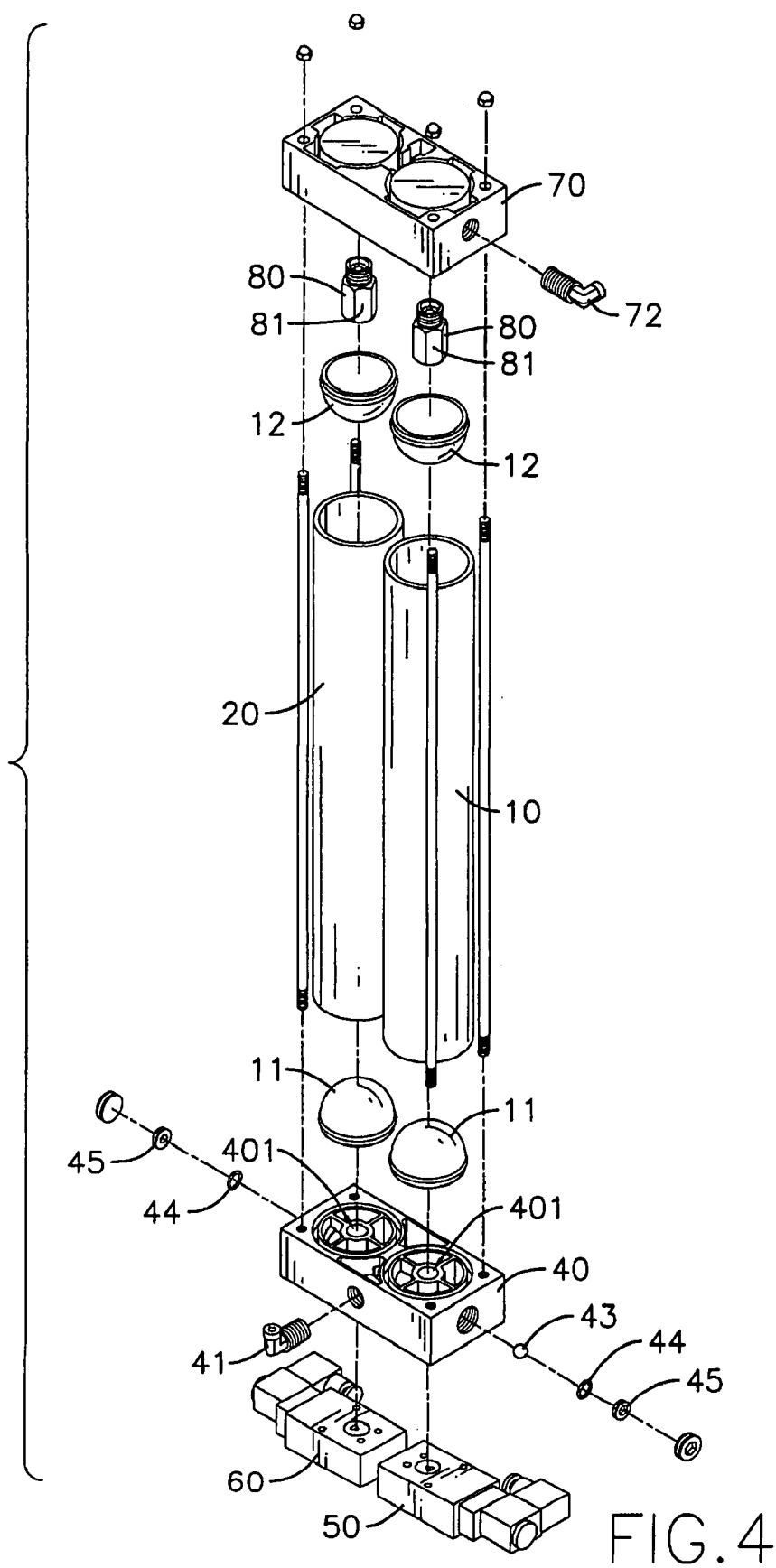
FIG. 4 is an exploded perspective view of the core unit in FIG. 3.

With further reference to FIG. 3, the core unit has two towers (10, 20), a lower air valve (40), an outside hole, two control valves (50, 60), an upper air valve (70), a three way valve, two check valves, four optional water filters (11, 12), an optional lower valve connector (41) and an optional upper valve connector (72) and an optional core water outlet tube (61).

The towers (10, 20) are parallelly mounted between the upper and lower air valves (70, 40) and respectively filled with a drying agent (30). Each of the towers (10, 20) has an upper opening and a lower opening.

Each water filter (11,12) may be a dome and may have an apex. The apex is mounted in the corresponding opening of the towers (10, 20) and each water filter (11,12) covers the corresponding opening of the tower (10).

The lower air valve (40) has an airway (42) and two waterways (401). The airway (42) is formed transversely through and connects the lower ends of the towers (10), communicates with the outside hole, is connected to the compressor (91) and may be threaded. The lower valve connector (41) is mounted in the lower valve (40) and provides pressurized air from the compressor (91). The, two waterways (401) are formed perpendicularly to the airway (42) and respectively communicating with the lower end of each tower (10, 20).

The control valves (50, 60) are mounted securely to lower air valve (40) and communicate with the waterways (401) and comprise a valve that can be opened or closed. The core water outlet tiibe (61) is connected to both of the control valves (50, 60) and provides the water to the core water outlet (95).

The three-way valve is mounted inside the airway (42) of the lower valve (40) between the two waterways (401), to alternately close one side of the airway (42) and may comprise two valve seat assemblies (44, 45) and a ball (43). The two valve seat assemblies (44) are respectively mounted in the airway (42) of the lower valve (40) and to both sides of the three-way valve. The ball (43) is mounted movably between the two valve seat assemblies (44).

Figure 5:
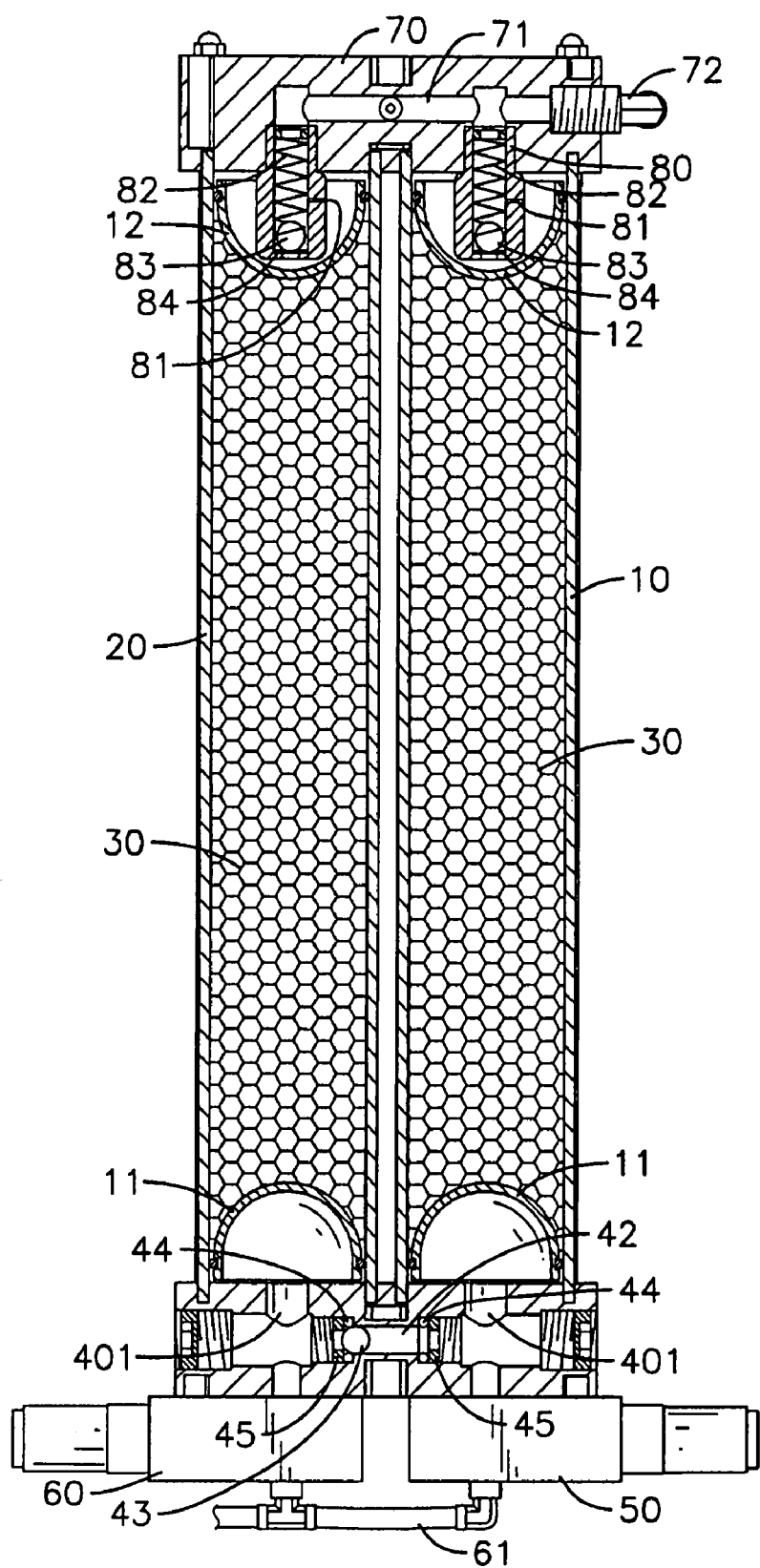
FIG. 5 is a side view in partial of the core unit in FIG. 3.

With reference to FIG. 5, when pressurized air flows through the lower valve (40), one of the control valves (50) is opened, the ball (43) presses against the corresponding valve seat assembly (44, 45) and prevents air passing. Therefore, water can drain out of one tower (10) and the pressurized air flows through the other tower (20).

The upper air valve (70) is mounted on the upper openings of the two towers (10, 20) and has an internal channel (71) and two mounting holes. The internal channel (71) is formed in the upper air valve (70) and has a mounting end formed through the upper valve (70). The mounting end is connected to the air filter (92) or the air vent (93). Each mounting hole communicates with the internal channel (71) and the upper opening of the corresponding tower (10, 20).

Each check valve is respectively mounted inside the corresponding mounting hole and the upper opening of the corresponding tower (10, 20). Each of the check valves has a chamber (80), a spring (82), a check ball (83), a check seat (84), a top end, a lower open end and an equalizing slot (81) defined through the chamber (80) and communicating with the upper end of the corresponding tower (10). The check seat (84), is mounted in lower end of the check valve. The check ball (83) is movably mounted in the chamber and is pressed towards the check seat (84) by the spring (82). The top end of the chamber (80) communicates with the corresponding mounting hole of the upper air valve (70). The upper valve connector (72) is mounted in the mounting hole. The drying agent (30) will absorb water from moist air and give water to dry air.

Based on the foregoing description of the structure of the core unit, the core unit generates air in a continuous manner. With reference to FIGS. 1, 3 and 5, when the left control valve (50) is open and the pre-dried air from the compressor (91) flows through the lower valve connector (41) of the lower air valve (40), the pre-dried air pushes the ball (83) to press against the left valve seat assembly (44, 45). Therefore, the pre-dried air only flows through the right tower (10).

Figure 6:
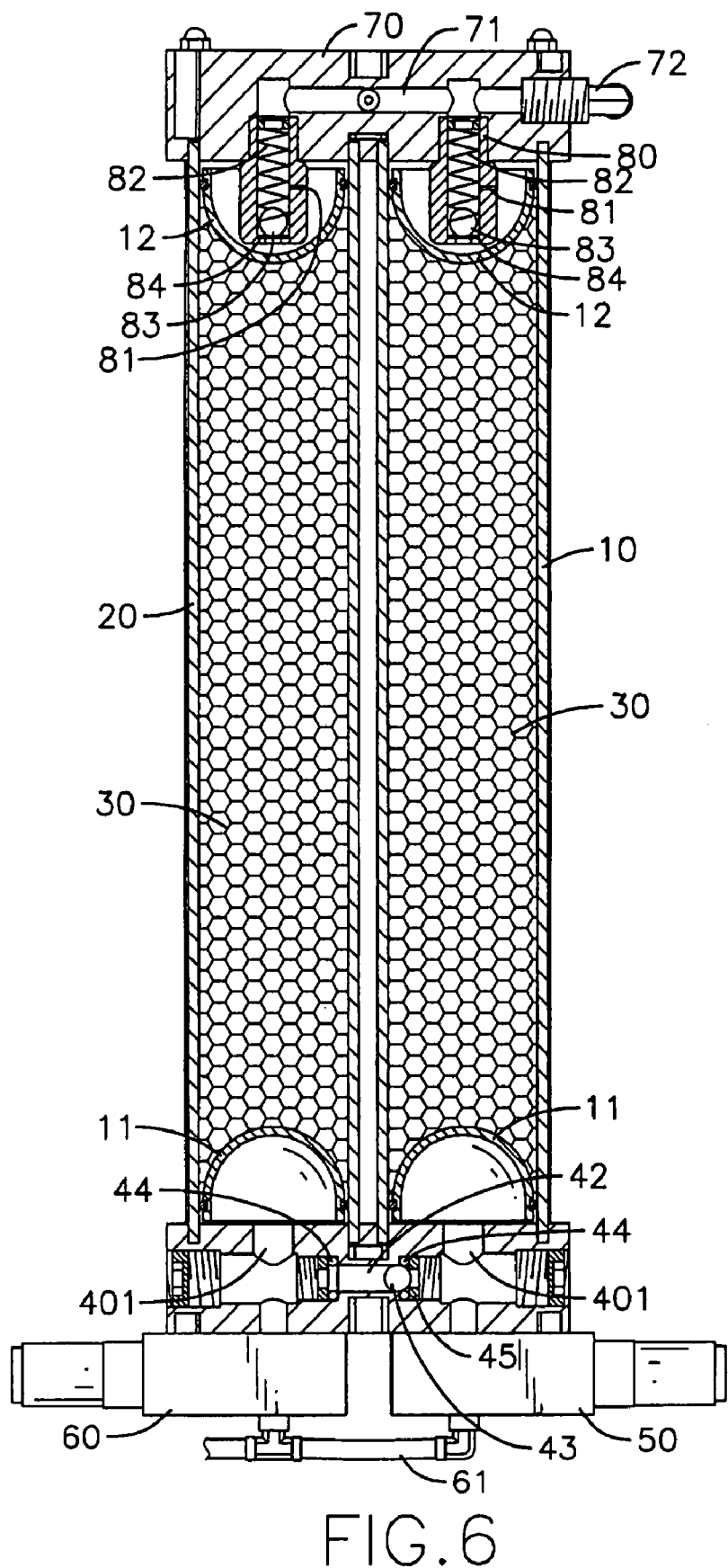
FIG. 6 is a cross sectional view in partial of the core unit in FIG. 3.

Since the tower (10) is filled with the drying agent (30), the water contained in the pre-dried air is removed by the drying agent (30) and the drying agent (30) becomes wetter. Therefore, the pre-dried air becomes dried air. Air pressure increases inside the right tower (10), so the check ball (83) inside the check valve pushes against the spring (82) to release the dried air to the internal channel (71).The dried air flows through the upper valve connector (72) to the filter (92) or the air vent (93). The dried air inside the internal channel (71) also flows to the left check valve. Since the chamber (80) of the check valve in the filter (12) on the left tower (20) has an equalizing slot (81), the dried air flows into the left tower (20) through the equalizing slot (81). Once the left control valve (60) is closed, air pressure in the left tower (20) increases until the air pressure in the left tower (20) is equal to that in the right tower (10). Then, the right control valve (50) is opened to release water and the dried air into the control water outlet tube (61). Therefore, the drying agent recovers the original drying function. The drying air passing through the control valve (50) is noisy so a muffler may be mounted on control valve (50) to reduce noise. With reference to FIGS. 1, 3 and 6, after the control valve (60) is opened, the air pressure inside the right tower (10) is lower than the air pressure in the left tower (20) so the ball (43) moves to press against the right valve seat assembly (44, 45), so the pre-dried air enters into the left tower (20). The above, outlined process switches between the left and right towers (10, 20) to provide a continuous flow of dried air to the air filter (92) or the air vent (93).

The core unit in accordance with the present invention fitted in the dehumidifier has a simple structure so reducing costs of manufacturing and by providing a continuous flow of dried air may be smaller than prior art and therefore of more practical use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A core unit of a dehumidifier comprising:
   a drying agent absorbing water from moist air and giving water to dry air;
   two towers being parallelly mounted in the core unit and filled with the drying agent and having upper and lower openings;
   a lower air valve mounted on the two lower openings of the towers, wherein the lower air valve has
      an airway being formed transversely through and connecting the lower ends of the towers;
      two waterways, formed perpendicularly to the airway and communicating with the airway and the lower opening of the corresponding tower; and
      an outside hole communicating with the airway;

two control valves being mounted securely to the lower air valve and communicating with the waterways and respectively communicating with the lower openings of the towers through the lower airway;

a three way valve being mounted inside the airway between the waterways alternately closing one side of the airway;

an upper air valve mounted on the upper openings of the towers, wherein the upper air valve comprises an internal channel formed in the upper valve and having a threaded end; and two mounting holes respectively communicating with the internal channel and the upper opening of the corresponding tower; and two check valves respectively mounted in the corresponding mounting hole of the upper air valve and the upper opening of the corresponding tower and each check valve comprising a chamber having:

a top end communicating with the corresponding lower hole of the upper valve;

a lower open end; and an equalizing slot defined through the chamber and communicating with the upper end of the corresponding tower.

2. The core unit as claimed in claim 1, further comprising:

two upper filters respectively covering the corresponding upper opening of the towers; and two lower filters respectively covering the corresponding lower opening of the towers.

3. The core unit as claimed in claim 2, wherein each of the upper and lower filters is a dome and has an apex being mounted in the corresponding upper opening of the towers.

4. The core unit as claimed in claim 1, wherein the outside hole of the lower air valve and the mounting hole of the upper air valve are threaded and the core unit further comprises:

a lower valve connector being mounted in the outside hole of the lower air valve; and an upper valve connector being mounted in the mounting hole of the upper air valve.

5. The core unit as claimed in claim 3, wherein the outside hole of the lower air valve and the mounting hole of the upper air valve are threaded and the core unit further comprises:

a lower valve connector being mounted in the outside hole of the lower air valve; and an upper valve connector being mounted in the mounting hole of the upper air valve.

6. The core unit as claimed in claim 1, wherein the three way valve further comprises:

two valve seat assemblies respectively mounted in the airway of the lower valve and to both sides of the three way valve adjacent to the corresponding waterway; and a ball being movably mounted between the two valve seat assemblies.

7. The core unit as claimed in claim 5, wherein the three way valve further comprises:

two valve seat assemblies respectively mounted in the airway of the lower valve and to both sides of the three way valve adjacent to the corresponding waterway; and a ball being movably mounted between the two valve seat assemblies.

8. The core unit as claimed in claim 1, wherein each of the two check valves further comprises:

a check seat being mounted in the lower end of the check valve;

a spring being mounted in the chamber; and a check ball being movably mounted in the chamber and pressed towards the check seat by the spring.

9. The core unit as claimed in claim 3, wherein each of the two check valves further comprises:

a check seat being mounted in the lower end of the check valve;

a spring being mounted in the chamber; and a check ball being movably mounted in the chamber and pressed towards the check seat by the spring.

10. The core unit as claimed in claim 7, wherein each of the two check valves further comprises:

a check seat being mounted in the lower end of the check valve;

a spring being mounted in the chamber; and a check ball being movably mounted in the chamber and pressed towards the check seat by the spring.

11. The core unit as claimed in claim 1, further comprising a core water outlet tube connected to both of the control valves.

* * * * *